(12) United States Patent
Wadams et al.

(10) Patent No.: US 8,156,896 B2
(45) Date of Patent: Apr. 17, 2012

(54) CLUMP RECOGNITION ANIMAL LITTER

(75) Inventors: Robert C. Wadams, Robbinsville, NJ (US); Steven T. Adamy, Lawrenceville, NJ (US); Frederick Lawson, Somerset, NJ (US); Patricia Pulido, Sayreville, NJ (US); Kenneth E. Kellar, Blue Ridge, VA (US)

(73) Assignee: Church & Dwight Co., Inc., Princeton, NJ (US)

( * ) Notice: Subject to any disclaimer, the term of this patent is extended or adjusted under 35 U.S.C. 154(b) by 217 days.

(21) Appl. No.: 12/515,396

(22) PCT Filed: Nov. 20, 2007

(86) PCT No.: PCT/US2007/085188
§ 371 (c)(1),
(2), (4) Date: May 18, 2009

(87) PCT Pub. No.: WO2008/064201
PCT Pub. Date: May 29, 2008

(65) Prior Publication Data
US 2009/0255478 A1    Oct. 15, 2009

Related U.S. Application Data

(60) Provisional application No. 60/866,559, filed on Nov. 20, 2006.

(51) Int. Cl.
*A01K 1/01* (2006.01)

(52) U.S. Cl. .......................................... 119/173
(58) Field of Classification Search .................. 119/173, 119/171
See application file for complete search history.

(56) References Cited

U.S. PATENT DOCUMENTS

| | | | | |
|---|---|---|---|---|
| 5,143,023 A * | 9/1992 | Kuhns | ........................... | 119/173 |
| 5,267,532 A * | 12/1993 | Franklin et al. | ................ | 119/173 |
| 5,371,054 A * | 12/1994 | Pluta et al. | ...................... | 502/62 |
| 5,996,534 A * | 12/1999 | Steckel et al. | ................. | 119/171 |
| 6,308,658 B1 * | 10/2001 | Steckel | ......................... | 119/173 |
| 6,382,132 B1 * | 5/2002 | Steckel et al. | ................. | 119/171 |
| 7,533,630 B2 * | 5/2009 | Steckel et al. | ................. | 119/165 |
| 7,665,418 B2 * | 2/2010 | Bracilovic | ..................... | 119/173 |
| 2005/0005869 A1 * | 1/2005 | Fritter et al. | ................... | 119/173 |
| 2005/0005870 A1 * | 1/2005 | Fritter et al. | ................... | 119/173 |
| 2005/0145186 A1 * | 7/2005 | Fung et al. | ..................... | 119/171 |
| 2006/0243212 A1 * | 11/2006 | Jenkins et al. | ................. | 119/171 |

* cited by examiner

*Primary Examiner* — Yvonne Abbott
(74) *Attorney, Agent, or Firm* — Frenkel & Associates, P.C.; Stephen B. Shear

(57) ABSTRACT

The present invention is directed towards a clump recognition animal litter that enables a user to visually identify and dispose of all used litter portions from unused litter, regardless of clump size and clump location within the litter. The clump recognition animal litter comprises a clumping component and a color-indicating material. The litter clumps and displays a color in response to wetness.

22 Claims, No Drawings

CLUMP RECOGNITION ANIMAL LITTER

REFERENCE TO RELATED APPLICATIONS

This application is related to U.S. Provisional Application Ser. No. 60/866,559 filed Nov. 20, 2006, and takes priority therefrom.

FIELD OF THE INVENTION

The present invention relates to an absorbent composition for animal dross and its method of use. More particularly, the present invention relates to a litter that agglomerates and displays a color upon being wetted.

BACKGROUND OF THE INVENTION

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces.

The dross-soiled absorbent must be regularly cleaned to maintain a hygienic environment and to thwart the emission of objectionable odors from the presence of the urine and fecal matter in the litter. Removal of fecal matter from any litter is somewhat easy as they are generally solid objects that can be physically removed from the litter. However, physical removal of the feces does not address the issues of removing liquid dross from the litter nor does it help reduce or eliminate odors caused by the urine absorbed into the absorbent. Thus it can be said that the removal of the liquid dross from the litter is harder to execute.

Though the absorbent material aids in absorbing liquid dross, it does nothing to aid in the removal of the liquid dross and to identify the liquid dross in the litter. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time accounts for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, adsorbing the liquid dross on its surface. For each absorbent material, offensive odors are eventually caused by the absorbed urine, and the entire contents of the litter box, including soiled absorbent material and unsoiled absorbent material, has to be discarded.

Currently clumping clays and other water absorbent material are used to improve litter compositions. An improved composition for animal litters uses the clayey soils or comminuted rocks, e.g. the sodium bentonites, comprising at least one water-swellable clay mineral in the montmorillonite clay family. These absorbent materials not only absorb liquid dross, but they aid in the identification of used litter from unused litter portions. These absorbent materials have the ability to clump and harden after contact with an aqueous liquid such as urine thus facilitating the removal of only the soiled portion of the litter in a litter box or cage during cleaning without the necessity of removing all the litter. The wetted clump has the ability to group into a size substantially larger than the individual particles comprising the litter.

Though these improved compositions have eased the owners' task of removing soiled litter portions, they are still short of addressing problems associated with the burial or splitting of the clumped dross. The buried or split clump, if not timely discovered, will emit offensive odors within a relatively short period of time. Thus when the clumped dross is buried or split the homeowner must still either patiently sift through the litter to remove the used portions or simply discard the partially soiled litter. As a result, the benefits of having a clumped litter are diminished since the removal of the clumped dross once again becomes a time-consuming as well as costly process.

The following prior art references illustrate aspects of the technology of animal litter preparation, and, in particular, disclose the use of clays in such litters.

U.S. Pat. No. 4,685,420 issued Aug. 11, 1987 to Stuart, discloses an animal litter composition comprising a water-absorbing polymer such as a polyacryate combined with a porous inert solid substrate such as clay.

U.S. Pat. No. 5,000,115 issued Mar. 19, 1991 to Hughes, discloses the use of a water swellable bentonite clay as an absorbent litter material. The clay absorbs the liquids in animal waste which on contacting the clay agglomerates it into a stable mass easily separated from the unwetted and unsoiled portion of the composition.

U.S. Pat. No. 5,267,532 issued Dec. 7, 1993 to Franklin, et al., discloses a pH-indicating material maintained on an inert carrier that is separate from the cat litter material. The pH-indicating material has dual indicators that provide one color transition at a low pH and a different color transition at a high pH so that acidic or alkaline animal urine problems can be visibly detected upon contact between the animal urine and the pH-indicating material.

U.S. Pat. No. 5,371,054 issued Dec. 6, 1994 to Pluta, et al., discloses an animal litter composition used to diagnose animal health problems. The composition comprises at least one uncalcined clay substrate having a calcium oxide content of less than about 5% by weight and wherein the clay mineral component of said substrate has an attapulgite content of at least about 35% by weight, in combination with at least one chemical pH indicator.

U.S. Pat. No. 6,619,233 issued Sep. 16, 2003 and U.S. Pat. No. 6,763,783 issued Jul. 20, 2004 both to Mochizuki, disclose a granulated-type, urine-discharge processing material for animals that discriminates between before-use and after-use. The material comprises a water absorbent granular body dyed with water soluble dyes or a water absorbent granular body containing powder of water soluble dyes, and a water absorbent surface layer covering a surface of the water absorbent granular body. The water absorbent surface layer and the water absorbent granular body are bonded to each other through a non-continuous water soluble adhesive layer formed of a plurality of adhesive non-coated parts and a plurality of adhesive coated parts which is coated on the surface of the water absorbent granular body. Discharged animal urine is permeated into the water absorbent granular body through the water absorbent surface layer and the non-continuous water soluble adhesive layer, or by dissolving the adhesive coated parts. Thereby, the water soluble dyes are eluted into the discharged urine so that the water absorbent surface layer is dyed through the non-continuous water soluble adhesive layer. The water absorbent granular body is chiefly composed of vegetable fiber or vegetable powder and contains inorganic fillers. The water absorbent granular body further contains powder of a water absorbent polymer so that the granular body can have rich water absorbing and retaining properties. No mention is made to clays in the patent.

A need exists for a clumping litter that clumps in response to wetness and can be readily discovered and removed from the remaining dry litter when clumped and wet.

SUMMARY OF THE INVENTION

A clump recognition animal litter is disclosed that enables a user to visually identify and dispose of all used litter portions from unused litter portions regardless of clump size and clump location. The clump recognition animal litter comprises a clumping component and a color indicating material. A wetted litter clumps and displays a color in response to wetness.

DETAILED DESCRIPTION OF THE INVENTION

The clump recognition animal litter of the present invention comprises a clumping component and a color indicating material. The litter clumps in response to wetness and displays a color that is distinct from the remaining dry litter. The colored, clumped mass enables a user to visually identify and dispose of all used litter portions from unused litter portions regardless of clump size and clump location within the litter.

The clumping components are absorbent materials such as naturally clumping clays, e.g. sodium bentonite, non-clumping clays combined with clumping agents, non-clay materials combined with clumping agents, organic based litter combined with clumping agents or even of a clumping clay, such as sodium bentonite, mixed with any of the above materials.

The color indicating material comprises a colorant and optionally a colorant substrate. In the present invention, the colorant may be suspended in the colorant substrate or the colorant may be directly added to the litter material itself. The color indicating material is generally water soluble and is activated when exposed to moisture. In some cases the colorant may be water insoluble. The colorant may be dyes of any kind including color-dyes approved by the U.S. Food and Drug Administration, paints, and indicators such as pH indicators.

The colorant substrates may be any water absorbing material. Examples include clays, zeolites, organic materials such as corncob or wheat derived substrates, baking soda, and compacted baking soda. Also included are paper and wood based materials and silica gels. Polymers may also serve as suitable colorant substrates such as poly acrylic acids, poly acrylate polymers and other super absorbent polymers (SAP), for instance, poly acrylic acid partial sodium salt.

The commonly used absorbent materials useful in animal litter are clays. The water-absorbent clayey component of the animal litters of this invention may be, for example, a clayey soil or comminuted rock containing at least one water swellable clay mineral. Such clay mineral may be, for example, a montmorillonoid or smectite, having a three-layer, sheet structure crystal lattice with two layers of silicon/oxygen tetrahedrons between which is a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated montmorillonoid clay minerals are montmorillonite and nontronite containing a dioctahedral central layer, and hectorite, saponite, and sauconite containing a trioctohedral central layer.

When the foregoing montmorillonoid clay minerals are contacted with water or water vapor, the water molecules penetrate between the layers causing interlayer or intracrystalline swelling and expansion of the entire lattice. This causes the particles of clayey component in the animal litter to agglomerate thus facilitating the removal of only that portion of the litter which is swelled by urine or other aqueous waste liquid.

The often used clayey component of the animal litter of the present invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The water-swellable bentonite clays useful in the animal dross absorbent compositions of the present invention include any water-swellable bentonite clay that hydrate in the presence of water, e.g., swell in the presence of water. The water-soluble bentonite clay can be selected from the group consisting of sodium bentonite, potassium bentonite, lithium bentonite, calcium bentonite and magnesium bentonite; or combinations thereof. The bentonite clay can be any member of the dioctahedral or trioctahedral smectite group, or a mixture thereof. Examples include Montmorillonite, Beidellite, Nontronite, Hectorite and Saponite; or combinations thereof.

In order to achieve the full advantage of the present invention, regardless of the water-swellable bentonite that is used in the litter box absorbent composition, it is preferred that the bentonite clay is not calcined. Calcination results a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

In accordance with another feature of the present invention, a water-swellable bentonite clay useful in a litter box absorbent composition is present in a particle size ranging from about 50 microns to about 3350 microns in diameter, and more preferably in a particle size ranging from about 600 to about 3350 microns in diameter; or, in other words, in a particle size of from about a 6 mesh to about 100 mesh. It has been found that water-swellable bentonite particles appreciably greater than about 3350 microns in diameter do not sufficiently cohesively agglomerate to allow facile physical separation of the wetted, agglomerated mass from the litter box. Furthermore, it has been found that water-swellable bentonite particles appreciably smaller than about 50 microns in diameter produce a litter box absorbent composition that is too dusty. However, in order to achieve the full advantage of the present invention, the water-swellable bentonite clay should be present in the composition in particle sizes across the entire range of about 600 to about 3350 microns because the smaller diameter water-swellable bentonite particles, upon being wetted, swell and serve as "bridges" between larger, wetted bentonite particles. The overall effect is the production of a sufficiently large wetted mass with excellent physical cohesive strength.

The animal litter market is dominated by clays. However, the naturally clumping clays are not the only sort of absorbent material useful in the litter. As mentioned above, other absorbent material may be used as litter such as non-clumping clays which have been converted to clumping clays with the addition of clumping agents.

These non-clumping clays include Attapulgite, calcium bentonite, palygorskite and sepiolite. Calcium bentonites can range in color from a cream, off-white to a dark reddish tan color and are frequently referred to in the trade under designations such as Mississippi Brown and Mississippi White. These animal litter clays can be divided into heavy weight clays and light weight clays. Calcium bentonite is a heavy weight clay. Sepiolite and attapulgite (palygorskite) are light weight clays.

Other clays useful in the litter may include kaolinite, illite, halloysite, hormite, vermiculite or mixtures thereof.

With the large part of the animal litter market being dominated by clumping and non-clumping clays, the remainder of the market is made up of a variety of non-clay substances. Examples of non-clay materials that can be used in the present invention and are treated with clumping agents include zeolites and silica gels. Zeolites and silica gels have been known to be used in the context of odor maintenance. It should be noted that clumping clays, such as sodium bentonite, may feasibly be mixed with any of the above materials to form an absorbent material.

Still other absorbent materials may be made of suitable organic based litter used herein with the addition of clumping agents. These natural products include, and are not limited to, such materials as wood based materials such as wood chips, wood shavings, wood flour, sawdust; straw; clay; porous beads such as those of polyethylene, polypropylene or polystyrene; paper based materials such as shredded paper; cloth; alfalfa; cotton; sand; bark; ground corn husks; ground sugar cane; lignocellulose; cellulose; calcium silicate; calcium sulfate; various grains (corn, wheat, flax etc.); or cellulosic products such as sawdust, woodchips or plant hulls. See e.g., U.S. Pat. Nos. 4,206,718; 4,727,824; 4,883,021; 5,109,804; 5,152,250 which are incorporated herein by reference.

Calcium bentonite can be treated with soda ash ($NaCO_3$) in an ion exchange process to provide sodium bentonite. This is done primarily in Europe where sodium bentonite is expensive and thus not readily available.

The clumping agents, or clump-enhancing materials used in the present invention are those known in the art, such as clumping clays, polysaccharides, water-soluble gums, dry particulate cellulose ethers, and water-absorbent polymers, among other things. Clumping agents promote adhesion of the fine size particles of litter substrates to each other as well as promoting adhesion of the granules to form an agglomerate when wetted. Preferably, the clumping agent allows the formation of a gelled agglomerate when exposed to a liquid, such as animal urine.

Natural occurring polymers for use in the present invention include for instance gum arabic, gum karaya, gum tragacanth, gum ghatti, guar gum, alginates, carrageenan, pectins, starches, dextran, xanthan gum, gelatin, gluten, corn starch and dried plants of the Plantago family. An example of a suitable gum-clumping agent is a water-soluble galactomannan gum, such as a guar gum or a locust bean gum, or an ether derivative thereof, that forms a gel upon contact with liquid. Suitable clumping agents of vinyl polymers include polyvinyl alcohol, polyvinyl esters such as polyvinyl acetate, polyvinylpyrrolidone, polyvinyloxazolidone, polyvinylmethyloxazolidone, copolymers and mixtures thereof.

Semisynthetic polymers useful as clumping agents in the present invention include cellulose ethers and guar gum derivatives. The cellulose ether can be methyl cellulose, hydroxyethyl cellulose, hydroxypropyl cellulose, ethylhydroxyethyl cellulose, methylhydroxypropyl cellulose, carboxymethyl cellulose, hydroxypropylmethylcellulose or mixtures thereof. A combination of various vinyl, natural and semisynthetic polymers can be used as clumping agents in the present invention.

Useful polymers are preferably capable of absorbing many times their own weight of an aqueous fluid such as urine. The formed agglomerates have sufficient mechanical integrity to be conveyed from a litter box as a discrete entity using methods typically used in removing waste product from a litter box such as with implements or manually by hand.

Other useful clumping agents in the present invention are commercially available, for example, commercially available cellulose ethers such as methylcellulose A4M and hydroxypropylmethylcellulose J15MS, E15LVP, K4M and K15M, are all available from The Dow Chemical Company. Various starches, including Starch 1500, are available from Colorcon, a division of Berwind Pharmaceutical Services, Inc. As another example, guar gum is available from Aqualon Company.

The colorant used in the clump recognition animal litter of the present invention may include dyes of any kind including Food, Drug and Cosmetic color-dyes approved by the U.S. Food and Drug Administration, paints, or indicators using dyes such as pH indicators. Water soluble pigments and water non-soluble pigments may also be used as colorants. The colorant will display a color in response to wetness or pH changes.

Types of color-dyes used in the clump recognition animal litter of the present invention include Food, Drug and Cosmetic colors which are approved by the U.S. Federal Drug Administration. Two such color-dyes include FD&C Blue No. 1 and FD&C Green No. 3. FD&C Blue # 1 is commonly named Brilliant Blue FCF and has a bright blue hue. The color additive FD&C Blue No. 1 is principally the disodium salt of ethyl[4-[p-[ethyl(m-sulfobenzyl) amino]α-(o-sulfophenyl) benzylidene]-2,5-cyclohexadien-1-ylidene](m-sulfobenzyl) ammonium hydroxide inner salt with smaller amounts of the isomeric disodium salts of ethyl[4-[p-[ethyl(p-sulfobenzyl) amino]-α-(o-sulfophenyl)benzylidene]-2,5-cyclohexadien-1-ylidene](p-sulfobenzyl)ammonium hydroxide inner salt and ethyl[4-[p-[ethyl(o-sulfobenzyl)amino]-α-(o-sulfophenyl)benzylidene]-2,5-cyclohexadien-1-ylidene](o-sulfobenzyl)ammonium hydroxide inner salt.

FD&C Green #3 commonly named Fast Green FCF and having a generally sea green color. The color additive FD&C Green No. 3 is principally the inner salt disodium salt of N-ethyl-N-[4-[[4-[ethyl[(3-sulfophenyl)methyl]amino]phenyl](4-hydroxy-2-sulfophenyl)methylene]-2,5-cyclohexadien-1-ylidene]-3-sulfobenzenemethanaminium hydroxide (CAS Reg. No. 2353-45-9); with smaller amounts of the isomeric inner salt disodium salt of N-ethyl-N-[4-[[4-[ethyl [(3-sulfophenyl)methyl]amino]phenyl](4-hydroxy-2-sulfophenyl)methylene]-2,5-cyclohexadien-1-ylidene]-4-sulfobenzenemethanaminium hydroxide; of N-ethyl-N-[4-[[4-[ethyl[(4-sulfophenyl)methyl]amino]phenyl](4-hydroxy-2-sulfophenyl)methylene]-2,5-cyclohexadien-1-ylidene]-4-sulfobenzenemethanaminium hydroxide and of N-ethyl-N-[4-[[4-[ethyl[(2-sulfophenyl)methyl]amino]phenyl](4-hydroxy-2-sulfophenyl)methylene]-2,5-cyclohexadien-1-ylidene]-3-sulfobenzenemethanaminium hydroxide.

Additionally, FD&C Green No. 3 is manufactured by the acid catalyzed condensation of one molecule of 2-formyl-5-hydroxybenzenesulfonic acid with two molecules from a mixture consisting principally of 3-[(ethylphenylamino)methyl]benzensulfonic acid, and smaller amounts of 4-[(ethylphenylamino)methyl]benzenesulfonic acid and 2-[(ethylphenylamino)methyl]benzenesulfonic acid to form the leuco base. The leuco base is then oxidized with lead dioxide and acid or with dichromate and acid to form the color-dye. The intermediate 2-formyl-5-hydroxybenzenesulfonic acid is prepared by the potassium permanganate oxidation of 2,2'-(1,2-ethenediyl)-bis(5-aminobenzenesulfonic acid) to sodium 5-amino-2-formylbenzenesulfonate. This amine is diazotized and the resulting diazonium salt is hydrolyzed to the desired 2-formyl-5-hydroxybenzenesulfonic acid. FD&C Blue No. 1 and FD&C Green No. 3 are the preferred colorants in this invention.

One pH indicator used to indicate animal health is a urine pH indicator. Such indicator-dyes utilize bromocresol purple which yields progressive color variation over the pH range of 5 to 9. This enables veterinarians to more accurately determine the pH level of an animal's urinary discharge. Other indicator-dyes can be selected to predict levels of glucose, ketones, bilirubin, urobilinogen, and protein. Diseases such as nephropathy and renal amyloidosis can be determined with such indicator-dye utilization.

The chemical indicator may include, but is not limited to, bromthymol blue (dibromothymolsulfonphthalein), phenol red (phenolsulfonphthalein), cresol red (o-cresolsulfonphthalein), bromcresol purple (dibromo-o-cresolsulfonphthalein), p-bromobenzenesulfonyl chloride, Congo red (diphenyldiazo-bis-1-naphthylamine-4-sodium sulfonate), methyl orange (sodium salt of dimethylaminoazobenzenesulfonic acid), bromchlorphenol blue (dibromodichlorophenolsulfonphthalein), P-ethoxychrysoidine (4'-ethoxy-2,4-diaminoazobenzene), naphthyl red (naphthylaminoazobenzene), bromcresol green (tetrabromo-m-cresolsulfonphthalein), methyl red (dimethylaminoazobenzene-P-carboxylic acid), lacmoid, litmus, chlorphenol red (dichlorophenolsulfonphthalein), benzoyl suramine G, azolitmin, bromphenol red (dibromophenolsulfonphthalein), dibromophenoltetrabromophenosulfonphthalein, neutral red (amino-dimethylamino-toluphenalin-hydrochloride), rosolic acid aurin (corallin), quinoline blue (cyanine), a-naphthiophthalein, metacresol purple (m-cresolsulfonphthalein), ethyl bis-[2,4-dinitrophenyl]acetate, Tropeolin 000 (a-Naphtol orange, a-naphthlolazobenzenepsulfonic acid), thymol blue (thymolsulfonphthalein), o-cresolphthalein, thymolphthalein, Nile blue (aminodiethylaminonaphthophenazoxoniumchloride). Curcumin (Brilliant yellow, sulfanilic acid-azodiphenylaminosulfonic acid), dimethylaminoazobenzene (dimethyl yellow, methyl yellow, butter yellow), Metanil yellow (Victoria yellow, Metanil extra, Tropeolin G, sodium salt of diphenylaminoazo-m-benzenesulfonic acid), Methyl Violet 6B (pentamethylbenzylpararosaniline-hydrochloride), p-Naphtholbenzene, Resazurin, Tropeolin 00 (Orange IV, Aniline Yellow, Diphenyl Orange, sodium salt of d ipheny-laminoazo-p-benzenesulfonic acid), xylenol blue (p-xylenonlsulfonephthalein) and mixtures thereof.

The various chemical pH indicators, referred to herein as "indicator-dyes," can be used in combination with the clay substrates of this invention in their acid, neutral (anhydride) or salt forms. Mixtures of two or more indicator-dyes may be used as well as non-mixtures (single indicator-dye).

As previously mentioned, the color indicating materials of this invention may be placed on a carrier substrate or, alternatively, the color indicating material can be directly added to the litter itself. Regardless of how the color indicating material is incorporated into the dry litter, the general appearance of the dry litter may be speckled since the color indicating material is dispersed throughout the litter. This is especially possible when the color indicating material is incorporated into the colorant carrier substrate and intermingles with the clumping component. As a result, when the litter forms a clump in response to wetness, the wetted clump displays a color distinct from the remaining dry litter likely due to the agglomeration of the color indicating material in the wetted clump.

The colorant carrier substrate used herein may be any water absorbing material. Examples include clays, zeolites, organic materials such as corncob or wheat derived substrates, baking soda (sodium bicarbonate), compacted baking soda. Also included are paper and wood based materials and silica gels. Polymers may also serve as suitable colorant substrates such as poly acrylic acids, poly acrylate polymers and other super absorbent polymers (SAP), for instance, poly acrylic acid partial sodium salt (Sodium PAA).

Many of these suitable colorant substrates have been discussed above, and include among others wood chips, wood shavings, wood flour, sawdust, straw, clay, porous beads such as those of polyethylene, polypropylene or polystryene, shredded paper, cloth, alfalfa, cotton, sand, bark, ground corn husks, ground sugar cane, lignocellulose, cellulose, calcium silicate, and calcium sulfate.

One useful colorant substrate is compacted sodium bicarbonate (SBC). In general, any commercial grade of SBC may be used in preparing the compacted SBC component in the compositions of this invention. Thus, the particles of SBC may initially be within the range of about 40 to 1,000 microns, preferably about 100 to 400 microns, and may have an SBC purity of at least about 90, preferably at least about 99 wt. %.

The powdered SBC is compacted into sheets and then broken into granules. Particle sizes of the compacted SBC for use with the litter composition of this invention range from about 200 microns and 5,000 microns with a preferred range of 600 microns to 2400 microns, when using clumping sodium bentonite clay. At this size, the SBC is of a comparable size to that of the bentonite clay and, accordingly, there is little, if any, segregation of the clay and SBC particles. A useful compacted SBC can be obtained from Stellar Manufacturing Co., Sauget, Ill. The litter compositions of this invention may contain about 0.1 to 20 wt. % of the compacted SBC and 80 to 99.9 wt. % of the swellable clay. Ranges of compacted SBC in the composition of this invention is of about 5-10%, of about 0.5 to 2.5 wt. %, and, in particular, about 2.0 wt. % are also applicable.

Used herein, the term "superabsorbent material" refers to a water-swellable, water-insoluble organic or inorganic material capable, under the most favorable conditions, of absorbing at least about 20 times its weight of liquids and other wet matter.

Known water swellable and water absorbent polymers used as colorant substrates are described in the following patents: U.S. Pat. Nos. Re. 31,822, 3,669,103, 3,686,024, 3,758,641, 3,810,468, 3,900,030, 3,926,891, 3,954,721, 3,959,569, 3,966,679, 3,980,663, 3,983,095, 3,989,586, 3,993,616, 4,008,353, 4,017,653, 4,018,951, 4,026,932, 4,041,020, 4,041,228, 4,041,231, 4,056,502, 4,057,521, 4,061,846, 4,071,650, 4,076,673, 4,076,928, 4,079,029, 4,132,695, 4,154,898, 4,186,233, 4,293,609, 4,424,247, 4,435,172, 4,444,830, 4,459,068, 4,486,374, 4,500,585, 4,500,670, 4,511,477, 4,526,240, 4,529,739, 4,535,098 and 4,685,420.

A water absorbent polymer is that of Formula I:

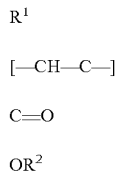

wherein $R^1$ is hydrogen or methyl, but is preferably hydrogen; wherein $R^2$ is an alkali metal; and wherein n is an integer from 10 to 50,000 inclusive but is preferably an integer from 100 to 10,000 inclusive.

Examples of suitable alkali metals include lithium, potassium and most preferably sodium.

A particular advantageous polymer of Formula I is the polymer of Formula II:

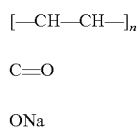

The polymers of Formula I and II are known in the art and can be produced according to known techniques. These polymers can be produced by polymerizing at least one monomer selected from the group consisting of acrylic acid, methacrylic acid and alkali metal salts of acrylic acid and methacrylic acid. The polymer when made using unneutralized acidic monomers is conveniently neutralized using inorganic bases such as alkali metal hydroxides.

The polymer of Formula I can be prepared using known polymerization techniques. This polymerization is preferably accomplished in the presence of a polymerization initiator. Suitable polymerization initiators include inorganic persulfates such as sodium persulfate. To produce the polymer of Formula I, monomers of acrylic acid, methacrylic acid or the alkali metal salts of acrylic or methacrylic acid are crosslinked by any suitable means. Preferably the crosslinking agent is a polyvinyl monomer such as trimethylolpropane di- or tri-acrylate. The polymer of Formula I may optionally have a water-insoluble inorganic material such as fumed silica incorporated therewith.

In one embodiment of the present invention the polymer of Formula I is produced in the presence of a higher alkyl ester of α,β ethylenically unsaturated carboxylic acids such as dodecyl acrylate, dodecyl methacrylate, lauryl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 4 to about 22, preferably from 8 to about 20, carbon atoms with ethylenically unsaturated carboxylic acids such as acrylic acid, methacrylic acid, fumaric acid, itaconic acid and aconitic acid, and maleic anhydride. Of these, lauryl methacrylate and other alkylmethacrylates and alkylacrylates wherein alkyl has from 10 to 20 carbon atoms are preferred. It is believed that the alkyl ester forms no part of the polymer of Formula I. The water absorbent polymer of Formula I can be employed in combination with the substrate in any amount sufficient to bind the urine.

Still other suitable superabsorbent material of the present invention can include natural materials such as agar, pectin, guar gum, and the like, as well as synthetic materials, such as synthetic hydrogel polymers which are known in the art. Other suitable polymers include hydrolyzed acrylonitrile grafted starch, acrylic acid grafted starch, and isobutylene maleic anhydride copolymers and mixtures thereof. The hydrogel polymers are preferably lightly crosslinked to render the material substantially water-insoluble. Crosslinking may, for example, be by irradiation or by covalent, ionic, Van der Wall, or hydrogen bonding. The superabsorbent materials may be in any form suitable for use in absorbent structures, including, particles, fibers, flakes, spheres, and the like. In the present invention it is possible for the superabsorbent material to comprise particles of a hydrocolloid which are known in the art.

In general, the color indicating material of the present invention is produced by suspending a water soluble colorant into a SAP with little or no colorant transfer. For example, a useful water absorbing substrate can be a Sodium PAA (poly acrylic acid partial sodium salt). The Sodium PAA can be mixed/blended with a 0.25% solution of an FD&C dye and was washed with aliquots of methanol under vacuum filtration. The dyed Sodium PAA can then be dehydrated at, for example, 70° C. in an oven. Once dried, the beads return to the original size and can then be crushed in a mortar with a pestle to reduce particle size. The treated Sodium PAA can then be blended with the water absorbent clumpable component such as sodium bentonite clay.

Alternatively, the color indicating material of the present invention may be produced by adding a colorant to any water absorbing substrate, such as a SAP or sodium bentonite, and adding a dye fixative to allow the colorant to be activated without bleeding. Dye fixatives are commonly used in paper making and in textile industries. Discussions and examples of dye fixatives are disclosed in U.S. Pat. Nos. 5,709,976; 5,922,088; and 6,679,924 the disclosures of which are incorporated herein by reference.

Regardless of whether added directly to the clay or water absorbing material, the dye level used herein ranges from 0.001 wt. % to 1 wt. % with a preferred range of 0.01 wt. %-0.1 wt. % relative to the material to which the dye is added.

The foregoing blending procedures may be carried out by hand or in any conventional equipment intended for the blending of a particulate solid material with other solid materials or liquids. Examples of suitable equipment are ribbon blenders, V-shell blenders, Marion mixers, Forberg blenders, and Norda mixers.

The compositions may also optionally contain a fragrance component. This may be a powdery "fragrance preblend" comprising a pleasant smelling oily liquid or "perfume oil" absorbed on particles of a fragrance carrier having a high surface to volume ratio. The perfume oil may comprise one or more essential or synthetic oils which are well-known in the art as providing a pleasant odor to the composition containing them and also as having the capability of somewhat masking unpleasant odors. The fragrance carrier may be any of a group of siliceous and other materials also well-known in the art as having a high surface to volume ratio and as being able to absorb perfume oils efficiently while maintaining their powdery consistency, e.g., dimorphous silicas or starches.

If a fragrance is utilized in the deodorizing additive, a fragrance preblend may be separately prepared, e.g., by adding a portion of the fragrance carrier to a mixer, initiating spraying of the perfume oil into the mixer while the remainder of the fragrance carrier is added, and continuing blending until a lump-free consistent powder is obtained. The blending period for preparation of the fragrance preblend may be, for example, about 10 to 60 min.

The perfume oil may be present in the fragrance preblend in an amount, for example, of about 25 to 75 wt. % based on the total weight of preblend, and the particle size of fragrance carrier and preblend may be in the range, for example, of 100 to 400 U.S. mesh size. The fragrance preblend may be blended into the litter composition and may be present in the final litter composition in an amount, for example, of about 0.5 to 3.0 wt. % based on the weight of the total composition.

The fragrance may also be utilized in encapsulated form or as a spray dried component.

The litter composition may also optionally contain zinc oxide (ZnO) which exerts a bactericidal action on the waste products in the litter. Since at least some of the foul odors of urine and fecal matter over a period of time is caused by the bacterial breakdown of the components of such matter, the anti-bacterial action of the ZnO results in a reduction of the generation of such odors. The ZnO may be present in an amount, for example, of about 0.5 to 1 wt. % of the litter composition, and may have a primary (unagglomerated) particle size of about 5 nanometers to 300 microns, preferably about 5 nanometers to 10 microns.

The litter compositions of this invention may be used for a wide variety of animals and birds, e.g., uncaged household pets such as cats and dogs, particularly puppies too young to be walked, caged pets such as hamsters, gerbils and rabbits, caged laboratory animals such as guinea pigs, mice, rats and monkeys, animals raised for fur such as mink, barnyard birds such as chickens, ducks and geese, and pet birds such as parrots, parakeets, canaries and pigeons.

In addition to the color indicating material described previously, the litter composition of this invention may contain other components for various purposes, e.g., disinfectants and deodorizers.

The compositions of this invention are particularly suitable for use as cat litters.

The invention is furthered by the following examples.

EXAMPLE 1

The present example shows a dye, FD&C Blue #1, being suspended into the SAP with little or no transfer to the external environment. 5.08 g of poly (acrylic acid) partial sodium salt (Sodium PAA) was weighed into a beaker. To the Sodium PAA, 20.0 ml of 0.25% wt./vol. FD&C Blue #1 was added and hand mixed in the beaker forming polymer beads. The dyed Sodium PAA was then washed with two 20.0 ml aliquots of methanol under vacuum filtration and next dehydrated in a 70° C. oven forming beads. Once the beads had returned to their original size by physical inspection, they were removed from the oven and crushed in a mortar to reduce particle size.

EXAMPLE 2

The present example shows a dye, FD&C Blue #1, suspended in a polymer.

50.11 g of Sodium PAA was weighed into a 1000 ml beaker. To the Sodium PAA, 50.01 ml of 0.25% wt./vol. FD&C Blue #1 was added and both components were hand mixed in the beaker forming polymer beads. An additional 50 ml of distilled water was added to the formulation to aid in dye absorption. Next, the dyed Sodium PAA was washed under vacuum filtration with two 200 ml aliquots of distilled water and then the polymer was placed into a 70° C. oven to dehydrate. Upon removal from the oven, a majority of the beads were clumped together. The clumping of the polymer beads during dehydration is likely due to excess dye that had not been removed from the polymer during the washing process.

Once dehydrated, the beads were placed into an electrical grinder to break up polymer chunks that had been formed during the dehydration process. The dyed Sodium PAA beads were sifted through a 600 μm sieve to separate particle sizes.

EXAMPLE 3

50.03 g of Sodium PAA was weighed into a 150×75 mm glass dish to which 50.0 ml of 0.25% wt./vol. FD&C Blue #1 was added; both were then hand mixed forming polymer beads. Next, 100.0 ml of distilled water was added to the Sodium PAA to aid the absorption of the dye. The dyed Sodium PAA beads were washed with three 200.0 ml aliquots of distilled water under vacuum filtration and then the beads were stored in a 70° C. oven to dehydrate them to their original size.

After the dyed polymers were visually inspected to verify dehydration, they were removed from the oven and hand ground with a mortar and pestle to break up the clumped polymer. Finally, the polymer beads were segregated with a 600 μm sieve.

EXAMPLE 4

200.00 g of Sodium PAA was weighed into a 2000 ml beaker to which 200.00 ml of 0.25% wt./vol. FD&C Blue #1 was added, both were then hand mixed forming polymer beads. Next, 200.0 ml of methanol AMD chromasolv was added to dehydrate the polymer. The water/solvent mixture was removed by vacuum filtration followed by washing the polymer with two 100.0 ml aliquots of methanol AMD chromasolv. The polymer beads were placed in a 70° C. oven to dry. Once dry, as determined by physical inspection, the clumped polymer was ground with a mortar and pestle to reduce the clumps to the original particle size.

EXAMPLE 5

The present example shows the suspension of FD&C Blue #1 in a commercial SAP, Degussa Stockosorb® product type C. Stocksorb is a product of Stockhausen, Inc., Greensboro, N.C.

10.20 g of Stockosorb C was weighed into a 250 ml beaker followed by 40.0 ml of 0.125% wt/vol FD&C Blue #1. Both components were hand mixed forming polymer beads. The dyed polymer beads were then washed under vacuum filtration with 500.0 ml distilled water. The polymer was dehydrated in a 70° C. oven.

EXAMPLE 6

10.04 g of Sodium PAA sodium salt was weighed into a 250 ml beaker. To the Sodium PAA, 20.0 ml of 0.25% wt./vol. FD&C Green #3 was added and hand mixed forming polymer beads. The polymer beads were next placed into a 70° C. oven to dehydrate. After the beads were dehydrated, they were removed from the oven and allowed to equilibrate to room temperature. Finally the beads were ground in a mortar and pestle.

EXAMPLE 7

The present example shows FD&C Blue #1 suspended in sodium bicarbonate and compacted into discreet particles with little or no transfer to the external environment.

0.001-0.1% of FD&C Blue #1 is blended with any grade of sodium bicarbonate in a convenient powder mixer such as a mixing screw, ribbon blender, Forberg blender, or V-shell blender. The mixture is then compacted in a compactor in the preferred particle size range of 600-2400 microns. The compacted mixture is added to the absorbent litter material at a level ranging from 1% to 10%.

EXAMPLE 8

Comparative litter clump samples were formed to study color performance of dyed Sodium PAA in 3% Sodium Bicarbonate Sodium Bentonite Clay.

The samples, shown in Table 1, below were formulated with polymer beads under 600 μm in size to decrease the visibility of the polymer in the dry litter. The litter clump samples were formed having a concentration of dyed polymer in the range between 1-30%. 20.0 ml distilled water was added to each sample to examine how distinguishable the wet clump was from the dry litter in the various polymer concentration levels.

TABLE 1

Affective Level Study of Dyed Polymer

| Sample # | % Dyed Polymer | Mass of Dyed Polymer (g) | Mass of Sodium Bentonite |
| --- | --- | --- | --- |
| A | 5 | 3.06 | 57.26 |
| B | 10 | 6.04 | 54.02 |
| C | 20 | 12.01 | 47.99 |
| D | 30 | 18.01 | 41.97 |

As displayed in Table 1, the polymer concentration between 1-10% dyed polymers showed sufficient color appearance to distinguish the wet clump from the dry clay.

EXAMPLE 9

The present example demonstrates the addition of the organic polymer sodium starch glycolate (SSG) to limit color transfer.

A pre-mix of 0.1 parts FD&C Blue #1 and 4.8 parts SSG (Glycolys D from Roquette) was first prepared. The pre-mix was then added to a mixture of 92.2 parts sodium bentonite and 2.9 parts sodium bicarbonate. The entire mixture was mixed until all parts were evenly distributed. Another mixture with Glycolys V117 (Primojel) instead of Glycolys D was also prepared. A third mixture, containing 0.1 parts FD&C Blue #1, 4.7 parts Glycolys D, and 1.2 parts polyvinylpyrrolidone (PCP K30 form ISP) in a pre-mix, added to 2.8 parts sodium bicarbonate in 91.2 parts sodium bentonite, was also prepared. As a control, a mixture containing 86.9 parts docium bentonite, 2.9 parts sodium bicarbonate, and 0.1 parts FD&C Blue #1 was finally prepared.

About 80 g of each mixture was then placed in separate dishes. To each was added 7 mL of deionized water. All litters exhibited whole-clump color changes. In order to assess tracking, each clump was firmly pressed with a piece of Whatman #4 filter paper at time intervals of 1 and 30 minutes following water application. Samples containing the SSG exhibited significantly reduced degrees of dye transfer.

What is claimed is:

1. A clump recognition animal litter comprising
   (1) a particulate water-absorbent clumpable component; and
   (2) a color-indicating material, wherein clumps of said litter display a color that is distinct from the remaining dry litter, due to agglomeration of said clumpable component in response to wetness.

2. The litter of claim 1, wherein the color-indicating material comprises:
   a colorant; and
   a colorant substrate.

3. The litter of claim 2, wherein said colorant is water-soluble.

4. The litter of claim 2, wherein said colorant is water non-soluble.

5. The litter of claim 2, wherein said colorant is a dye.

6. The litter of claim 2, wherein said colorant substrate is a water absorbing material.

7. The litter of claim 2, wherein said colorant substrate is a super absorbent polymer.

8. The litter of claim 7, wherein said super absorbent polymer is poly acrylic acid partial sodium salt.

9. The litter of claim 2, wherein the colorant substrate is compacted sodium bicarbonate.

10. The litter of claim 9, wherein said compacted sodium bicarbonate is in the amount of about 0.1 to about 20 wt. % of said clump recognition animal litter.

11. The litter of claim 9, wherein said compacted sodium bicarbonate is in the amount of about 5 to about 10 wt. % of said clump recognition animal litter.

12. The litter of claim 1, wherein said clumpable component is a clay mineral selected from montmorillonoid and smectite.

13. The litter of claim 12, wherein said clay is bentonite.

14. The litter of claim 13, wherein said bentonite is a sodium bentonite.

15. The litter of claim 1, wherein said clumpable component comprises
   an absorbent material; and
   a clumping agent.

16. The litter of claim 15, wherein said absorbent material is a non-clumping clay.

17. The litter of claim 15, wherein said absorbent material is a non-clay material.

18. The litter of claim 15, wherein said absorbent material is organic based material.

19. The litter of claim 15, wherein said clumping agent is a polymer.

20. The litter of claim 19, wherein said clumping agent is a polysaccharide.

21. The litter of claim 19, wherein said polymer is a cellulose ether.

22. The litter of claim 15, wherein said clumping agent is a clumping clay.

* * * * *